US011148792B2

(12) United States Patent
Blacha

(10) Patent No.: US 11,148,792 B2
(45) Date of Patent: Oct. 19, 2021

(54) COMPOUND HELICOPTER WITH A FIXED WING ARRANGEMENT

(71) Applicant: AIRBUS HELICOPTERS DEUTSCHLAND GMBH, Donauworth (DE)

(72) Inventor: Martin Blacha, Donauworth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 143 days.

(21) Appl. No.: 16/594,399

(22) Filed: Oct. 7, 2019

(65) Prior Publication Data

US 2020/0140072 A1 May 7, 2020

(30) Foreign Application Priority Data

Nov. 7, 2018 (EP) .................................... 18400030

(51) Int. Cl.
*B64C 27/26* (2006.01)
*B64C 1/26* (2006.01)
*B64C 39/06* (2006.01)

(52) U.S. Cl.
CPC ................ *B64C 27/26* (2013.01); *B64C 1/26* (2013.01); *B64C 39/068* (2013.01)

(58) Field of Classification Search
CPC ............................... B64C 27/26; B64C 39/068
See application file for complete search history.

(56) References Cited

U.S. PATENT DOCUMENTS

| 2,653,778 A | 9/1953 | Bennett et al. |
| 2,940,693 A | 6/1960 | Hislop |
| 3,698,666 A | 10/1972 | Monti |
| 4,365,773 A * | 12/1982 | Wolkovitch .......... B64C 39/068 244/123.7 |
| 8,181,901 B2 * | 5/2012 | Roesch ................... B64C 27/26 244/6 |

(Continued)

FOREIGN PATENT DOCUMENTS

| EP | 2574546 A1 | 4/2013 |
| EP | 2690010 A1 | 1/2014 |

(Continued)

OTHER PUBLICATIONS

European Search Report for European Application No. EP 18400030. 5, Completed by the European Patent Office, dated May 19, 2019, 7 pages.

*Primary Examiner* — Joseph W Sanderson
(74) *Attorney, Agent, or Firm* — Brooks Kushman P.C.

(57) ABSTRACT

A compound helicopter with a fuselage and at least one main rotor that is at least adapted for generating lift in operation, the at least one main rotor being arranged in an upper region of the fuselage, wherein at least one propeller is provided that is at least adapted for generating forward and/or backward thrust in operation. The at least one propeller is mounted to a fixed wing arrangement that is laterally attached to the fuselage, the fixed wing arrangement comprising at least one upper wing and at least one lower wing. An upper wing section arrangement is provided in the upper region of the fuselage, the at least one upper wing of the fixed wing arrangement being mounted to the upper wing section arrangement.

20 Claims, 7 Drawing Sheets

(56) References Cited

U.S. PATENT DOCUMENTS

| | | | |
|---|---|---|---|
| 8,220,737 B2* | 7/2012 | Wood | B64C 29/0025 244/12.3 |
| 8,820,673 B2* | 9/2014 | Cacciaguerra | B64C 27/26 244/6 |
| 8,840,057 B2* | 9/2014 | Moret | B64C 27/12 244/6 |
| 9,266,607 B2* | 2/2016 | Fink | B64C 39/04 |
| 9,321,526 B2* | 4/2016 | Fink | B64C 27/26 |
| 10,131,424 B2* | 11/2018 | Fink | B64C 39/068 |
| 10,479,502 B2* | 11/2019 | Barbieri | B64D 1/22 |
| 2009/0321554 A1 | 12/2009 | Roesch | |
| 2010/0224721 A1* | 9/2010 | Wood | B64C 39/068 244/12.3 |
| 2013/0082135 A1 | 4/2013 | Moret | |
| 2013/0175383 A1 | 7/2013 | Cacciaguerra | |
| 2014/0061366 A1* | 3/2014 | Fink | B64C 39/04 244/6 |
| 2014/0061367 A1* | 3/2014 | Fink | B64C 27/26 244/6 |
| 2014/0353419 A1* | 12/2014 | Prud'Homme-Lacroix | B64C 27/82 244/6 |
| 2015/0284076 A1* | 10/2015 | Cacciaguera | B64C 3/185 244/6 |
| 2017/0197709 A1* | 7/2017 | Fink | B64C 27/82 |
| 2017/0341748 A1* | 11/2017 | Barbieri | B66D 1/60 |

FOREIGN PATENT DOCUMENTS

| | | |
|---|---|---|
| EP | 2690011 A1 | 1/2014 |
| EP | 3141478 A1 | 3/2017 |
| FR | 2976912 A1 | 12/2012 |
| WO | 2008142257 A1 | 11/2008 |
| WO | 2010036419 A2 | 4/2010 |
| WO | 2010036419 A3 | 4/2010 |

* cited by examiner

COMPOUND HELICOPTER WITH A FIXED WING ARRANGEMENT

CROSS-REFERENCE TO RELATED APPLICATIONS

This application claims priority to European patent application No. EP 18400030.5 filed on Nov. 7, 2018, the disclosure of which is incorporated in its entirety by reference herein.

BACKGROUND OF THE INVENTION

(1) Field of the Invention

The invention is related to a compound helicopter with a fuselage and at least one main rotor that is at least adapted for generating lift in operation, wherein at least one propeller is provided that is at least adapted for generating forward and/or backward thrust in operation, the at least one propeller being mounted to a fixed wing arrangement that is laterally attached to the fuselage.

(2) Description of Related Art

Compound helicopters are in addition to so-called convertiplanes basically the most relevant concepts aiming to overcome horizontal flight deficiencies of conventional helicopters, i.e. helicopters with a main rotor and an auxiliary tail rotor that is adapted to counter torque, by introducing attributes of fixed wing aircrafts to such conventional helicopters. Accordingly, a given compound helicopter can be designed for lift compounding, thrust compounding or a combination of both, all of which basically aim to off-load a respective main rotor from its simultaneous lifting and propulsive duties to allow for higher forward speeds of the given compound helicopter.

More specifically, lift compounding implies adding wings to a conventional helicopter, hence enabling increase of an underlying load factor of the helicopter and reaching of a higher maneuverability. This enables provision of a compound helicopter with improved efficiency at moderately high speed, but at the expense of reduced efficiencies at lower forward speeds and in hover.

Thrust compounding, in turn, implies adding essentially horizontally oriented auxiliary propulsion units to a conventional helicopter. This has been typically accomplished by means of a single or a pair of propellers being driven by drive shafts powered by main turboshaft engines of a respective helicopter. The use of a pair of propulsion units has the advantage of providing a compound helicopter with improved anti-torque capabilities without the need of an additional tail rotor, hence relativizing the inherent system complexity of the thrust compound configuration.

A more extended configuration of a compound helicopter includes both the addition of wings and propulsion units. In this case, lift during cruise is simultaneously provided by a given main rotor and the wings. Higher forward speed is provided by horizontally oriented auxiliary propulsion units of the compound helicopter. The compound helicopter, thus, overcomes underlying rotor lift limits by means of the wings and underlying rotor thrust limits by means of the propulsion units. As a result, a higher load factor is obtained along with potential for higher speed. In particular, use of a pair of thrust propulsion units—opposed and both offset relative to each other and to a longitudinal axis of the compound helicopter—enables for a simultaneous torque correction.

Exemplary compound helicopters with two wing-mounted propellers are described in the documents EP 2 574 546 A1, EP 2 690 010 A1, U.S. Pat. Nos. 2,653,778 A, 2,940,693 A, 3,698,666 A, and WO 2008/142257 A1. In all of these documents, an underlying configuration of the respective compound helicopters is based on a monoplane wing structure with a single main wing plane.

Deviating therefrom are compound helicopters with braced wing configurations, i.e. with so-called box-wing or joined-wing configurations. Generally, such box-wing or joined-wing configurations are provided in the form of a bi-plane wing structure with two main wing planes. In the box-wing configuration respective upper and lower wings are joined together to form a loop-shaped closed wing without defining conventional wing tips, while in the joined-wing configuration the respective upper and lower wings are respectively joined to each other at associated wing tips.

However, compound helicopters with two wing-mounted propellers and box-wing or joined-wing configurations generally require a comparatively complex arrangement of respective main load carrying structural members, such as skins, ribs, and spars, in order to join respective upper and lower wings together and to a given fuselage of the compound helicopters in an efficient way. Nevertheless, in a respective upper region and, more specifically, in a respective upper deck of the compound helicopter, an optimal arrangement and positioning of structural members of the upper wings would collide with respective main load carrying members of the main gear box, the engines, drive shafts for lateral propellers, and other systems of the compound helicopter, which are usually located in the upper deck. Accordingly, in case of a joined-wing configuration with a propeller or engine/propulsion unit attached at wing tips formed by the upper and lower wings, the stiffness of the joined wing, the wing-to-fuselage connection, and the upper deck arrangement as such drives the design and the requirements for implementation of such a joined-wing configuration.

In other words, the challenge is that the most efficient load path for the interconnection of the upper wing with the fuselage collides with the position of the main gear box, which normally overrules the relevance of wing loads and requirements, as rotorcrafts in general are defined by the structure mechanic requirements defined by the rotors. A resulting architecture as defined in conventional compound helicopters accounts for this general rule and accepts additional weight or decreased performance respectively by establishing inefficient structure mechanical principles.

Exemplary compound helicopters with two wing-mounted propellers and box-wing or joined-wing configurations are described in the documents FR 2 976 912 A1, EP 2 690 011 A1, and EP 3 141 478 A1. These exemplary compound helicopters are described in more detail hereinafter.

The document FR 2 976 912 A1 describes a compound helicopter having a fixed wing arrangement in box-wing configuration comprising lower and upper wings that are each parallel to a given pitch axis of the compound helicopter. The wings exhibit a constant dihedral and the upper wings entirely cover the lower wings so as to minimize down-wash drag.

The document EP 2 690 011 A1 describes a compound helicopter having a fixed wing arrangement in joined-wing configuration, wherein a lower wing and an upper wing are provided on each side of the compound helicopter. Both wings are essentially straight and interconnected to each other at a wing interconnection region, and a pusher propeller is installed in the interconnection region behind associated trailing edges of both wings. This joined-wing configuration especially outstands by its improved mechanical efficiency in terms of less structural weight and larger stiffness, as well as by improved inherent operational safety characteristics and improved system integration, especially referring to an underlying accessibility of a main gear box of the compound helicopter.

The document EP 3 141 478 A1 describes another compound helicopter having a fixed wing arrangement in joined-wing configuration. The compound helicopter has a fuselage and at least one main rotor that is at least adapted for generating lift in operation. The fuselage comprises a lower side and an upper side that is opposed to the lower side. The at least one main rotor is arranged at the upper side. At least one propeller is provided that is at least adapted for generating forward thrust in operation, the at least one propeller being mounted to a fixed wing arrangement that is laterally attached to the fuselage. The fixed wing arrangement comprises at least one upper wing that is arranged at an upper wing root joint area provided at the upper side of the fuselage and at least one lower wing that is arranged at a lower wing root joint area provided at the lower side of the fuselage. The upper and lower wings are at least interconnected at an associated interconnection region.

However, in all above-described compound helicopters with two wing-mounted propellers and box-wing or joined-wing configurations, there is almost no space available in the upper region, respectively upper deck, to transfer occurring loads between respective upper wings and the fuselage properly in the respective upper wing root joint area located in the upper deck, where the upper wings are connected to the fuselage. In other words, the greatest challenge for compound helicopters with main rotor and lateral propellers at the wing tips is the stiffness requirement of the box-wing or joined-wing configuration and, more particularly, of the upper wings that drives the architecture and overall wing weight.

One additional and significant problem consists in that the main gear box, the engine drive shafts and flight control systems occupy almost all available space in the upper deck, which is needed to interconnect both upper wings to the fuselage. Therefore, the direct and, thus, most efficient load path for a stiff wing attachment is blocked by the main gear box and, in consequence, a deviation for loads emanating from the wings needs to be chosen which, however, makes the wing interconnection soft, although stiffness is the most important criterion.

Finally, the wing integration from respective upper wings at the upper deck causes several problems due to space allocation with respect to air intake, main gear box, main gear box struts, torque reaction devices, and others.

BRIEF SUMMARY OF THE INVENTION

It is, therefore, an object of the present invention to provide a new compound helicopter in braced wing configuration that overcomes the above described drawbacks and that exhibits an improved arrangement of respective individual structural items in its upper deck in a way that addresses both the need for compensating main loads emanating from the compound helicopter's main rotor and main gear box, and the need for an efficient and stiff load path in a respective center wing area of an associated box-wing or joined-wing assembly.

This object is solved by a compound helicopter with a fuselage, at least one main rotor that is operably coupled to an associated main gear box, and a fixed wing arrangement that is laterally attached to the fuselage.

More specifically, according to the present invention a compound helicopter with a fuselage and at least one main rotor that is operably coupled to an associated main gear box and at least adapted for generating lift in operation is provided. The fuselage comprises a lower region and an upper region that is opposed to the lower region. The at least one main rotor and the associated main gear box are arranged in the upper region. At least one propeller is provided that is at least adapted for generating forward and/or backward thrust in operation. The at least one propeller is mounted to a fixed wing arrangement that is laterally attached to the fuselage, via at least one wing section arrangement as described below. The fixed wing arrangement comprises at least one upper wing and at least one lower wing which are at least interconnected at an interconnection region and which are respectively connected to the fuselage via at least one wing section arrangement as described below. Each propeller is mounted to an associated interconnection region. An upper wing section arrangement is provided in the upper region of the fuselage. The at least one upper wing of the fixed wing arrangement is mounted to the upper wing section arrangement.

More generally, the at least one upper wing defines an upper wing quarter chord line and an upper wing center axis. Similarly, the at least one lower wing defines a lower wing quarter chord line and a lower wing center axis. A respective upper wing sweep angle of the at least one upper wing is preferably defined as an angle between a respective upper wing quarter chord line and a pitch axis of the compound helicopter, the upper wing quarter chord line being the line which spans 25% of the upper wing chord.

Advantageously, increase of the upper wing sweep angle improves the upper wings' resistance to bird strikes. Indeed, with an increased upper wing sweep angle the impact energy which needs to be dissipated in case of a bird strike is decreased. This arrangement improves protection of the cables, hydraulics, and mechanical installations arranged in the upper wing and, thus, increases safety of the inventive compound helicopter.

More particularly, the inventive compound helicopter advantageously exhibits an improved upper wing configuration in the upper region of the fuselage and offers a significant augmentation of stiffness. The augmentation of the stiffness beneficially allows for a structural weight reduction. Moreover, the inventive compound helicopter allows to solve various problems caused by the lack of available space in its upper region. Furthermore, the inventive compound helicopter comprises an improved connection of its upper wings to its upper deck.

According to one aspect, the upper wing section arrangement is provided in the upper region of the fuselage, respectively upper deck, and at least one upper wing of the fixed wing arrangement is removably mounted to the upper wing section arrangement by means of a hinged connection or a clamped connection, which is e.g. mounted to the upper wing front spar and/or to the upper wing aft spar. The upper wing may alternatively be rigidly attached to the upper wing section arrangement.

More specifically, the upper wing section arrangement preferably comprises at least one upper wing section front spar and at least one upper wing section aft spar. Both the upper wing section front and aft spars are connected to associated main frames of the fuselage that support the main gear box. Preferably, the upper front wing section front and aft spars form an integral part of the fuselage and implement, at least in part, the associated main frames of the fuselage. In other words, the associated main frames of the fuselage that support the main gear box and the upper wing section front and aft spars preferentially define a monolithic structure without any joints or seams.

Advantageously, a required stiffness of the upper wing, which can be made comparatively thin with respect to conventional upper wings, can be decreased significantly, as the total length of the upper wing has the greatest influence on occurring deflections. More specifically, as the Euler buckling length of the upper wing is in a quadratic ratio to its respective deflection, a reduction of the upper wing length of 20% with respect to a conventional length would decrease a respective conventional deflection by 36%.

Moreover, as bending is generally inevitable for wings, as they are bending loaded items, providing the upper wing section arrangement with a profile having an increased thickness will lead to an increase of the overall stiffness of the fixed wing arrangement. Consequently, increasing the thickness of the upper wing section arrangement profile will permit to reduce a respective structural weight of the fixed wing arrangement. By way of example, increasing the thickness may be achieved by increasing the chord of the upper wing section arrangement in the attachment area. The correspondingly increased thickness of the profile offers more space for a bigger flexible coupling of the drive train in the upper wing which, on one hand, provides more space for inspection and installation and, on the other hand, decreases the stiffness requirements with respect to the propeller drive shaft and, thus, leads to weight savings.

Moreover, it should be noted that a major disadvantage of a joined-wing arrangement is its low stiffness around the vertical axis regardless of the upper and lower wings being staggered or non-staggered. The orientation of the main principal axis system of the joined-wing attachment to the fuselage is generally almost parallel to the vertical axis. In case of a crash occurring in flight direction, the joined-wings of the joined-wing arrangement tend to move forward, and the ability to withstand high accelerations against flight direction is low. This is caused by the big lever arm provided between respective lateral gear boxes in combination with comparatively big masses (i.e. gear boxes, propellers, related systems) at the ends of the wings. The upper wing section arrangement decreases this lever arm as well and the support of wing movement in flight direction is improved. Thus, the risk of the fixed wing arrangement moving into the cabin is decreased. Consequently, in case of a crash the safety is increased.

Advantageously, the upper wing increases a respective overall wing area significantly and is adding lift to the fixed wing arrangement. This additional portion of lift is generated in an area close to the fuselage, where the downwash of the compound helicopter in hover is comparatively low. Whilst the lift in forward flight is accounted completely, the hover performance is impacted only at a small amount. In addition, the lever arm of the upper and lower wings is low and only leads to a small amount of bending, which is beneficial for the overall structure in general.

Advantageously, depending on a selected fixed wing arrangement configuration, an underlying aerodynamic lift can be balanced with respect to the center of the aerodynamic lift required in forward flight such that an improved center of gravity position can be achieved.

Furthermore, in order to create a comparatively big inertia, it is usually required to design stiff crossbeams having a comparatively big height. Thus, these stiff crossbeams extend in vertical direction above a respective upper deck panel and below the upper deck panel. The upper deck panel must be cut to assemble the full upper deck arrangement, resulting in additional splices, bolting lines and a related effort to assemble the full upper deck arrangement. Advantageously, in the inventive compound helicopter it is no longer necessary to make additional cuts in the upper deck, since already existing frames are used. Besides that, this manufacturing and assembly simplification permits to reduce weight of the structure.

Moreover, the upper wing section arrangement in the inventive compound helicopter permits to maintain the attachment of the main gear box to the upper deck in a conventional way, and there is no longer any interaction between the torque reaction system of the main gear box and the upper deck crossbeams for the wing attachment. This allows to re-use the complete dynamic system as it is used in conventional helicopters without modification. This construction permits to reduce costs. Moreover, the movement of the main gear box is no longer interacting with the wing connection to the crossbeams. Thus, wing connection and main gear box suspension at the fuselage are improved.

Preferably, at least one upper wing of the fixed wing arrangement is removably mounted to the upper wing section arrangement by means of a hinged connection or a clamped connection.

Preferably, at least one upper wing of the fixed wing arrangement is rigidly attached to the upper wing section arrangement.

Preferably, the upper wing section arrangement comprises at least one starboard side upper wing section and at least one portside upper wing section. The at least one upper wing of the fixed wing arrangement is mounted to one of the at least one starboard side upper wing section or to the at least one portside upper wing section.

Preferably, the at least one starboard side upper wing section and the at least one portside upper wing section are interconnected by means of an associated center wing box that is arranged in the upper region of the fuselage.

It should be noted that several variations of the architecture of the upper wing section arrangement are possible according to the architecture and individual requirements of the aircraft. In most cases, the lower skin of the upper wing section arrangement may be included to form the center wing box. The upper skin of the upper wing section arrangement could also be included in order to form the center wing box, as well as both the upper and the lower skin of the upper wing section arrangement.

Preferably, the upper wing section arrangement is an integral part of the fuselage.

Preferably, the associated center wing box comprises at least one front spar and at least one aft spar. One of the at least one front spar or the at least one aft spar is implemented by a main frame of the fuselage that supports the main gear box.

Preferably, each one of the at least one starboard side upper wing section and the at least one portside upper wing section comprises at least one upper wing front spar and at least one upper wing aft spar. The at least one upper wing front spar is connected to the at least one front spar of the associated center wing box, and the at least one upper wing aft spar is connected to the at least one aft spar of the associated center wing box.

Preferably, the at least one upper wing front spar is an integral part of the at least one front spar of the associated center wing box, and the at least one upper wing aft spar is an integral part of the at least one aft spar of the associated center wing box.

The upper wing front spars and the upper wing aft spars may be combined with already existing horizontal parts of the main frame of the fuselage. No additional crossbeams as interconnection to the fuselage between both wings are required.

The main frames in the upper region of the fuselage are generally already comparatively massive due to their use to introduce the loads from the main gear box and their need to support the main gear box in case of a vertical crash and, thus, prevent the main gear box from penetrating into the cabin. The main frames of the fuselage have, by definition, comparatively huge load bearing capabilities in the wing-span width direction. The use of the already existing main frames of the fuselage for implementation of the upper wing section arrangement offers weight saving potential, and the main frames of the fuselage may only be slightly reinforced. Furthermore, the location of the main gear box fixtures can be used as already existing hard points, which saves structural weight on top.

Preferably, the upper wing section arrangement comprises at least one equipment compartment that is provided for accommodating compound helicopter equipment, in particular a rescue hoist or a life raft.

Advantageously, due to the significantly increased volume in the upper deck as a result of provision of the upper wing section arrangement, an equipment compartment can be integrated into the upper wing section arrangement. This equipment compartment is preferably provided for accommodating helicopter equipment, in particular a rescue hoist or a life raft. This helicopter equipment can directly be fixed to a respective upper wing section front spar and/or a respective upper wing section aft spar.

The additional space provided by the upper wing section arrangement configuration offers available space for helicopter equipment on the starboard side upper wing section of the aircraft, as well as on the portside upper wing section of the aircraft. The stiff upper wing spars can be taken as load introduction points of respective hoist loads to the structure respectively fuselage in a region where the main load carrying items of the structure are already very stiff.

Preferably, a lower wing section arrangement is provided in the lower region of the fuselage. The at least one lower wing of the fixed wing arrangement is mounted to the lower wing section arrangement.

Preferably, the lower wing section arrangement comprises at least one starboard side lower wing section and at least one portside lower wing section. The at least one lower wing of the fixed wing arrangement is removably mounted to one of the at least one starboard side lower wing section or the at least one portside lower wing section by means of a hinged connection or a clamped connection.

Preferably, the lower wing section arrangement comprises at least one starboard side lower wing section and at least one portside lower wing section. The at least one lower wing of the fixed wing arrangement is rigidly attached to one of the at least one starboard side lower wing section or to the at least one portside lower wing section.

The arrangement and the configuration of both the upper wing section arrangement and the lower wing section arrangement, as well as the upper wings and the lower wings, are very flexible. Thereby, the arrangement and the configuration advantageously fit with any structure according to the mechanic and aerodynamic requirements. For example, the aerodynamic profile of all wings as well as its setting and shape can be chosen according to the aerodynamic requirement.

The wingspan of the upper wing and the lower wing is preferably limited by the greatest distance between the center line and the outer end of the lower wing section arrangement and/or the upper wing section arrangement, thereby defining the maximum width of the compound helicopter for transportation with dismounted wings. The position of the joint between the lower wing and the lower wing section arrangement and between the upper wing and the upper wing section arrangement can almost be defined arbitrarily.

Preferably, a wheel-type main landing gear is provided. The wheel-type main landing gear is mounted to the at least one starboard side lower wing section and the at least one portside lower wing section, adjacent to the at least one lower wing of the fixed wing arrangement.

Preferably, the wheel-type main landing gear is at least partly retractable into the at least one starboard side lower wing section and the at least one portside lower wing section in operation.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
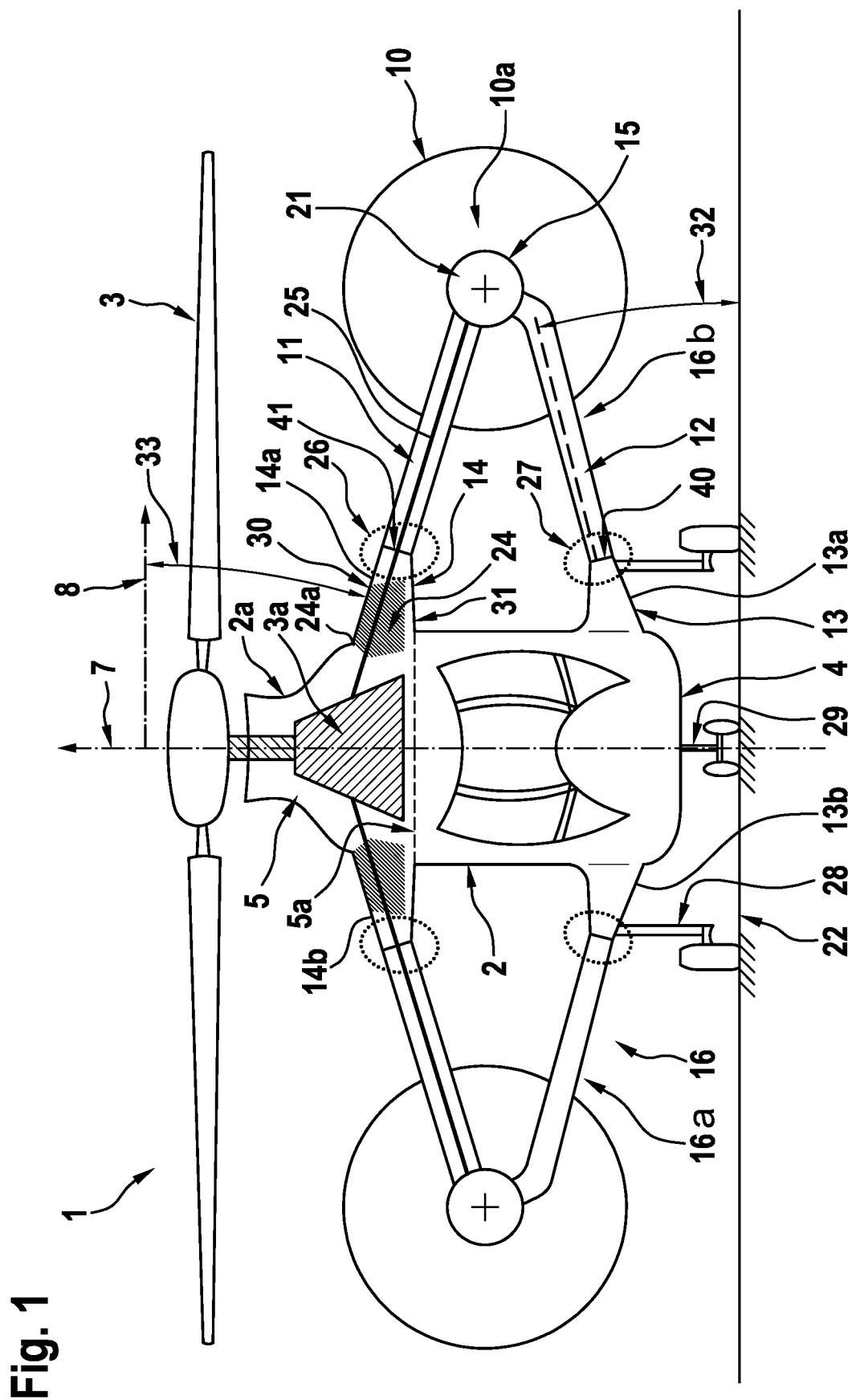
FIG. 1 shows a partly transparent front view of an exemplary compound helicopter with an upper and a lower wing section arrangement.
Figure 2:
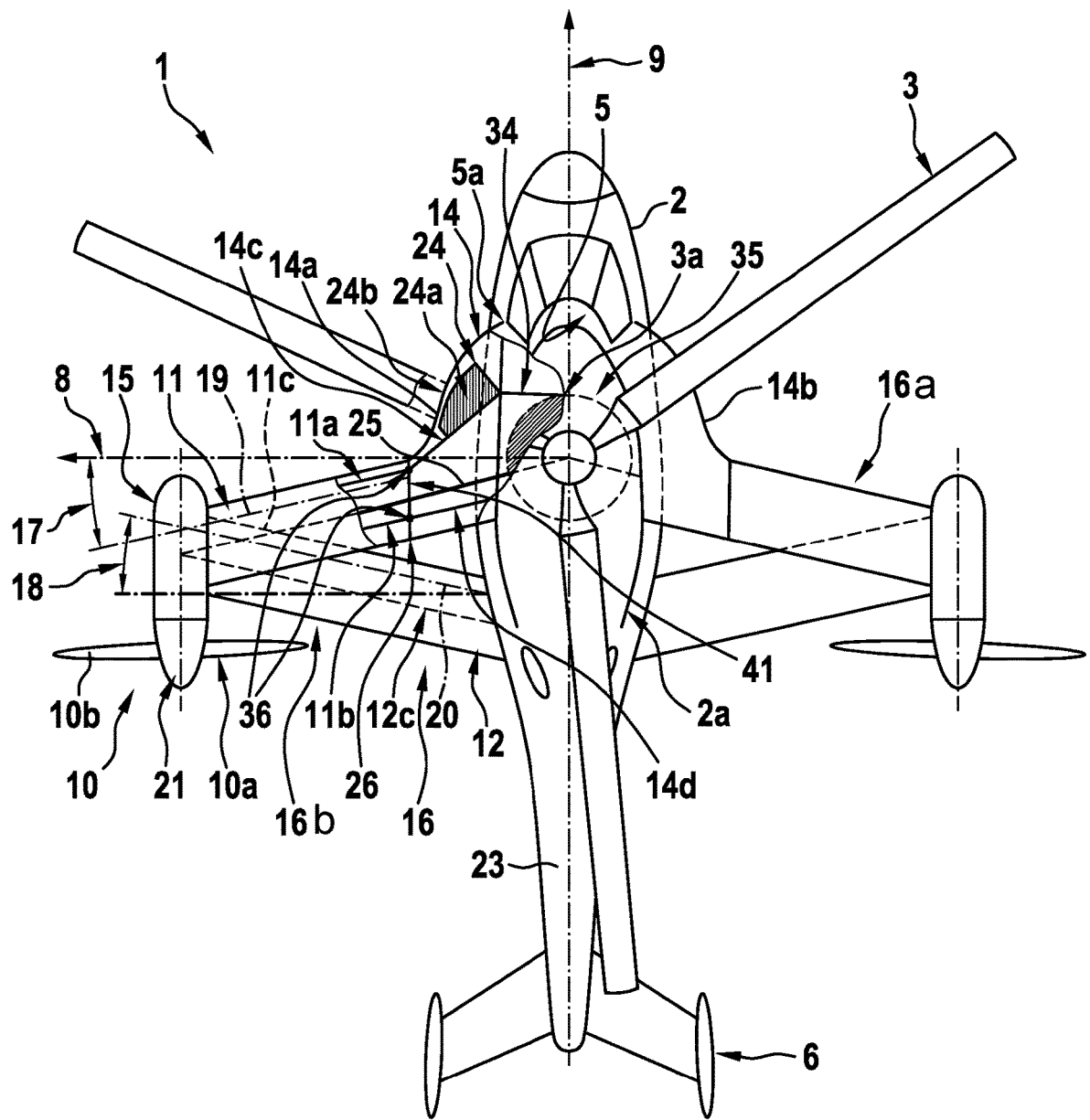
FIG. 2 shows a top view of the compound helicopter of FIG. 1 without the lower wing section arrangement.

FIG. 1 shows a compound helicopter 1 according to the present invention, which is exemplarily standing on ground 22. For purposes of illustration, the compound helicopter 1 is shown with three mutually orthogonal directions forming a three-dimensional frame of reference. A "longitudinal" direction corresponds to a respective roll axis (9 in FIG. 2) inherent to the compound helicopter 1, which is also referred to as "X-axis" hereinafter. Another direction, said to be "transverse", is perpendicular to the roll axis (9 in FIG. 2) and corresponds to a respective pitch axis 8 of the compound helicopter 1. This transverse direction is also referred to as "Y-axis" hereinafter. A respective plane formed by the X- and Y-axes is considered to be "horizontal" and corresponds to a top view plane of the compound helicopter 1 (cp. FIG. 2). A third direction corresponds to a respective yaw axis 7 of the compound helicopter 1, which is oriented perpendicular to the horizontal plane and also referred to as "Z-axis". A respective plane formed by the Y- and Z-axes corresponds to the front view plane of the compound helicopter 1 as illustrated in FIG. 1. According to one aspect, the compound helicopter 1 is at least essentially symmetrical about the yaw axis 7 and the roll axis (9 in FIG. 2).

The compound helicopter 1 illustratively comprises a fuselage 2 that is provided with an engine cowling 2a. The fuselage 2 illustratively defines a lower region 4 and an upper region 5 of the compound helicopter 1 that is opposed to the lower region 4. Moreover, and by way of example, an empennage (6 in FIG. 2) is rigidly mounted to a tail boom (23 in FIG. 2) defined by the fuselage 2.

Furthermore, the compound helicopter 1 comprises at least one main rotor 3 that is at least adapted for generating lift in operation. The at least one main rotor 3 is preferably arranged in the upper region 5 of the fuselage 2 and is associated to a main gear box 3a provided in the upper region 5 of the fuselage 2. An upper deck 5a is located in the upper region 5 of the fuselage 2.

Preferably, the compound helicopter 1 comprises at least one propeller 10 that is at least adapted for generating forward thrust in operation. The at least one propeller 10 is preferentially mounted to a fixed wing arrangement 11, 12 that is laterally attached to the fuselage 2. Illustratively, the compound helicopter 1 comprises two propellers 10, each one of them being arranged on each side of the fuselage 2.

The compound helicopter 1 preferably comprises box wings 16 that form the fixed wing arrangement 11, 12. The box wings 16 exemplarily comprise upper and lower wing assemblies 16a and 16b. Illustratively, the upper and lower wing assembly 16a forms a starboard side wing assembly and the upper and lower wing assembly 16b forms a portside wing assembly.

More specifically, the fixed wing arrangement 11, 12 comprises by way of example at least one pair of upper and lower wings 11, 12 arranged on a portside of the compound helicopter 1, which form the portside wing assembly 16b. The fixed wing arrangement 11, 12 further comprises by way of example at least one pair of upper and lower wings 11, 12 arranged on a starboard side of the compound helicopter 1, which form the starboard side wing assembly 16a.

It should be noted that for clarity and simplicity of the drawings only the upper wing and the lower wing of the starboard side wing assembly 16a are labeled with the reference signs 11 and 12, respectively. Consequently, only the starboard side wing assembly 16a is described in greater detail hereinafter, representative for both wing assemblies 16a, 16b, which preferably exhibit a similar configuration.

Preferably, the upper and lower wings 11, 12, which are preferentially staggered, are at least interconnected at an associated wing interconnection region 15. At least one of preferentially two propellers 10 is mounted to the associated wing interconnection region 15.

Each one of the propellers 10 preferably comprises a housing 21 that is rigidly attached to an associated one of the wing interconnection regions 15. Illustratively, each one of the propellers 10 comprises a propeller disc 10a, at least one propeller blade (10b in FIG. 2) and a propeller gear box (10c in FIG. 5). Each propeller 10 is preferably driven by a drive shaft 25 running through the upper wing 11 and an upper wing section arrangement 14. The drive shaft 25 is preferably driven by the main gear box 3a.

According to one aspect, the upper wing section arrangement 14 comprises at least one equipment compartment 24 with an external geometry (24b in FIG. 2) that can be determined in an application-specific manner with respect to respectively underlying requirements in order to allow storage of an associated equipment 24a. This equipment 24a may e.g. be a rescue hoist or a life raft. However, another helicopter equipment is likewise useable.

Preferably, the upper wing section arrangement 14 is an integral part of the fuselage 2. In other words, the upper wing section arrangement 14 is preferentially integrally formed with the fuselage 2.

More specifically, the upper wing section arrangement 14 is preferentially provided in the upper region 5 of the fuselage 2. Preferably, the upper wing section arrangement 14 is covered by an upper skin 30 and a lower skin 31. The upper skin 30 and the lower skin 31 are connected to the fuselage 2 and can be used to enclose the load carrying structure in order to form a center wing box (35 in FIG. 2).

The upper wing section arrangement 14 preferably comprises at least one starboard side upper wing section 14a and at least one portside upper wing section 14b. Preferentially, the upper wing 11 of the starboard side wing assembly 16a is removably mounted to the upper wing section arrangement 14 and, more specifically, to the at least one starboard side upper wing section 14a by means of an associated joint 41 located at an associated wing interconnection region 26.

Furthermore, according to one aspect a lower wing section arrangement 13 is provided in the lower region 4 of the fuselage 2. The lower wing section arrangement 13 preferably comprises at least one starboard side lower wing section 13a and at least one portside lower wing section 13b. Preferentially, the lower wing 12 of the starboard side wing assembly 16a is removably mounted to the lower wing section arrangement 13 and, more specifically, to the at least one starboard side lower wing section 13a by means of an associated joint 40 located at an associated wing interconnection region 27.

By way of example, the joints 40 and 41 may be embodied by a hinged connection, a clamped connection, and any other suitable means that allows to removably mount the upper wing 11 of the starboard side wing assembly 16a to the at least one starboard side upper wing section 14a and/or the lower wing 12 of the starboard side wing assembly 16a to the at least one starboard side lower wing section 13a. Alternatively, the joints 40 and 41 may be embodied by means of a rigid attachment.

According to one aspect, the upper wing 11 exhibits an anhedral angle 33 relative to the transverse Y-axis 8 of the compound helicopter 1. Moreover, the lower wing 12 preferably exhibits a dihedral angle 32. The dihedral angle 32 is defined as an angle of the respective centroidal axis of the lower wing 12 with respect to the horizontal plane of the compound helicopter 1, which is illustratively parallel to ground 22.

According to one aspect, the compound helicopter 1 comprises a wheel-type main landing gear 28. The latter is preferably mounted to the at least one starboard side lower wing section 13a and the at least one portside lower wing section 13b. Furthermore, the wheel-type main landing gear 28 is preferentially at least partly retractable into the starboard side lower wing section 13a and the portside lower wing section 13b in operation of the compound helicopter 1.

Illustratively, the compound helicopter 1 further comprises a wheel-type nose landing gear 29. The latter is preferably arranged at a nose section of the fuselage 2, i.e. upstream of the wheel-type main landing gear 28.

FIG. 2 shows the compound helicopter 1 of FIG. 1 with the at least one main rotor 3, the two propellers 10, and the fuselage 2 having a tail boom 23, to which an empennage 6 is rigidly mounted. Illustratively, each one of the propellers 10 comprises the propeller disc 10a, at least one propeller blade 10b and a propeller gear box (10c in FIG. 5). The compound helicopter 1 comprises the fixed wing arrangement 11, 12 with the box wings 16 comprising the starboard side wing assembly 16a and the portside wing assembly 16b, which respectively comprise the upper wing 11 and the lower wing 12.

FIG. 2 further illustrates a roll axis 9, i.e. the X-axis, and the pitch axis 8, i.e. the Y-axis, both of which are inherent to the compound helicopter 1. FIG. 2 also further illustrates the upper wing section arrangement 14 that comprises the at least one equipment compartment 24. Illustratively, the equipment compartment 24 is only shown on the starboard side of the upper wing section arrangement 14 and exemplarily exhibits a slightly rounded external geometry 24b. The equipment compartment 24 may, however, also be located on the portside of the upper wing section arrangement 14, or on both sides of the upper wing section arrangement 14.

As described above with reference to FIG. 1, the upper wing 11 is preferably removably attached to the upper wing section arrangement 14 by means of the joint 41 located at the wing interconnection region 26. According to one aspect, the upper wing 11 comprises at least one upper wing front spar 11a and at least one upper wing aft spar 11b. The upper wing 11 illustratively defines an upper wing quarter chord line 19 and an upper wing center axis 11c. The joint 41 illustratively comprises hinges 36.

In contrast thereto and in contrast to FIG. 1, the lower wing 12 is according to one aspect directly mounted to respectively integrally formed with, i.e. formed as an integral part of the fuselage 2. In other words, according to one aspect the inventive compound helicopter 1 may be provided without the lower wing section arrangement 13 of FIG. 1. The lower wing 12 illustratively defines a lower wing quarter chord line 20 and a lower wing center axis 12c.

Preferably, the compound helicopter 1 exhibits different sweep angles. Each sweep angle is defined as an angle of a respective one of the quarter chord line 19, 20 with respect to the transverse Y-axis 8 of the compound helicopter 1. More specifically, an upper wing sweep angle 17 is defined by an inclination of the upper wing quarter chord line 19 relative to the transverse Y-axis 8, the upper wing quarter chord line being the line which spans 25% of the upper wing chord. Similarly, a lower wing sweep angle 18 is defined by an inclination of the lower wing quarter chord line 20 relative to the transverse Y-axis 8.

According to one aspect, the compound helicopter 1 comprises a center wing box 35 located in the upper region 5 of the fuselage 2, i. e. on the upper deck 5a. The center wing box 35 preferably comprises at least one front spar 34 and at least one aft spar (38 in FIG. 3). At least one of the front spar 34 or the aft spar (38 in FIG. 3) is preferably implemented by a main frame of the fuselage 2 that supports the main gear box 3a.

Preferably, the center wing box 35 interconnects the starboard side upper wing section 14a and the portside upper wing section 14b. More specifically, preferably each one of the starboard side upper wing section 14a and the portside upper wing section 14b comprises at least one upper wing section front spar 14c and at least one upper wing section aft spar 14d. The at least one upper wing section front spar 14c is preferably connected to the front spar 34 of the center wing box 35, and the at least one upper wing section aft spar 14d is preferably connected to the aft spar (38 in FIG. 3) of the center wing box 35.

Figure 3:
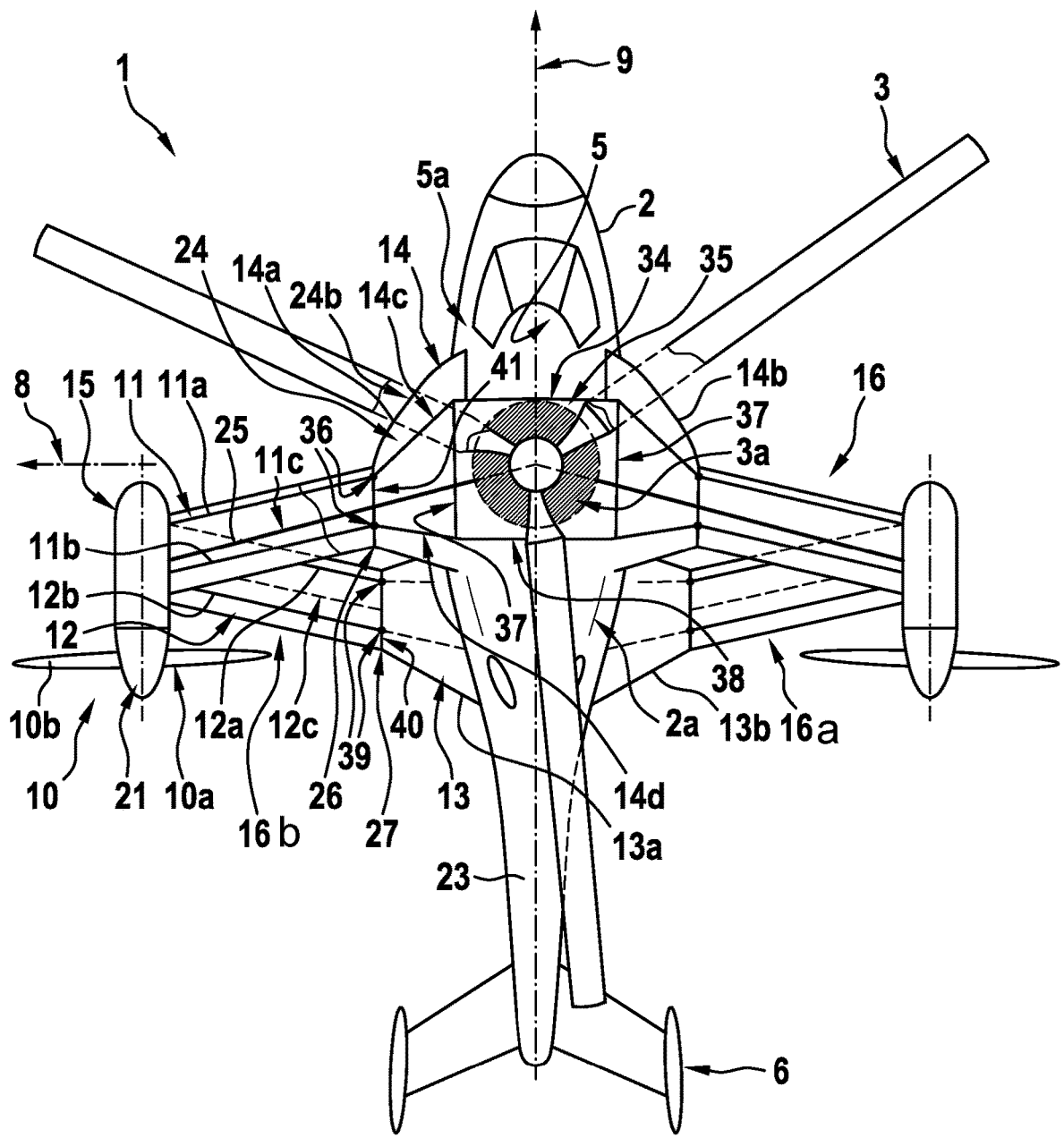
FIG. 3 shows a top view of the compound helicopter of FIG. 1 with the upper and lower wing section arrangements having an at least essentially identical outwards extension.

According to one aspect, the at least one upper wing section front spar 14c is an integral part of the front spar 34, and the at least one upper wing section aft spar 14d is an integral part of the aft spar (38 in FIG. 3). In other words, the at least one upper wing section front spar 14c is preferably integrally formed with the front spar 34 such that both form a monolithic structure, and the at least one upper wing section aft spar 14d is preferably integrally formed with the aft spar (38 of FIG. 3) such that both form a monolithic structure.

FIG. 3 shows the compound helicopter 1 of FIG. 1 with the at least one main rotor 3, the two propellers 10, and the fuselage having the tail boom 23, to which the empennage 6 is rigidly mounted. The compound helicopter 1 comprises the fixed wing arrangement 11, 12 with the box wings 16 comprising the starboard side wing assembly 16a and the portside wing assembly 16b, which respectively comprise the upper wing 11 and the lower wing 12.

FIG. 3 further illustrates the roll axis 9, i. e. the X-axis, and the pitch axis 8, i. e. the Y-axis, both of which are inherent to the compound helicopter 1. FIG. 3 also further illustrates the upper wing section arrangement 14 and the lower wing section arrangement 13 of FIG. 1.

As described above with reference to FIG. 2, the upper wing 11 preferably comprises the at least one upper wing front spar 11a and the at least one upper wing aft spar 11b, both of which are preferably arranged in parallel to the center axis 11c. Likewise, the lower wing 12 preferably comprises at least one lower wing front spar 12a and at least one lower wing aft spar 12b, both of which are preferentially arranged in parallel to the center axis 12c.

As described above with reference to FIG. 1, the upper wing 11 is preferably removably attached to the upper wing section arrangement 14 by means of the joint 41 located at the wing interconnection region 26. Similarly, the lower wing 12 is preferably removably attached to the lower wing section arrangement 13 by means of the joint 40 located at the wing interconnection region 27. The joints 40 and 41 may be embodied by a hinged connection, comprising illustratively hinges 36 and 39.

More specifically, according to one aspect the upper wing front spar 11a is attached to the upper wing section front spar 14c at joint 41 by means of a first hinge, and the upper wing aft spar 11b is attached to the upper wing section aft spar 14d by means of a second hinge, the first and second hinges being referred to with the reference sign 36. Similarly, the lower wing front spar 12a is attached to a respective lower wing section front spar at joint 40 by means of a third hinge, and the lower wing aft spar 12b is attached to a respective lower wing section aft spar by means of a fourth hinge, the third and fourth hinges being referred to with the reference sign 39.

Moreover, as described above with reference to FIG. 2, the compound helicopter 1 comprises the center wing box 35 located on the upper deck 5a in the upper region 5 of the fuselage 2. The center wing box 35 comprises the front spar 34 and at least one aft spar 38. At least one of the front spar 34 or the aft spar 38 is according to one aspect implemented respectively formed by a main frame of the fuselage 2 that supports the main gear box 3a. Preferably, at least one lateral rib 37 is located between the front spar 34 and the aft spar 38.

Figure 4:
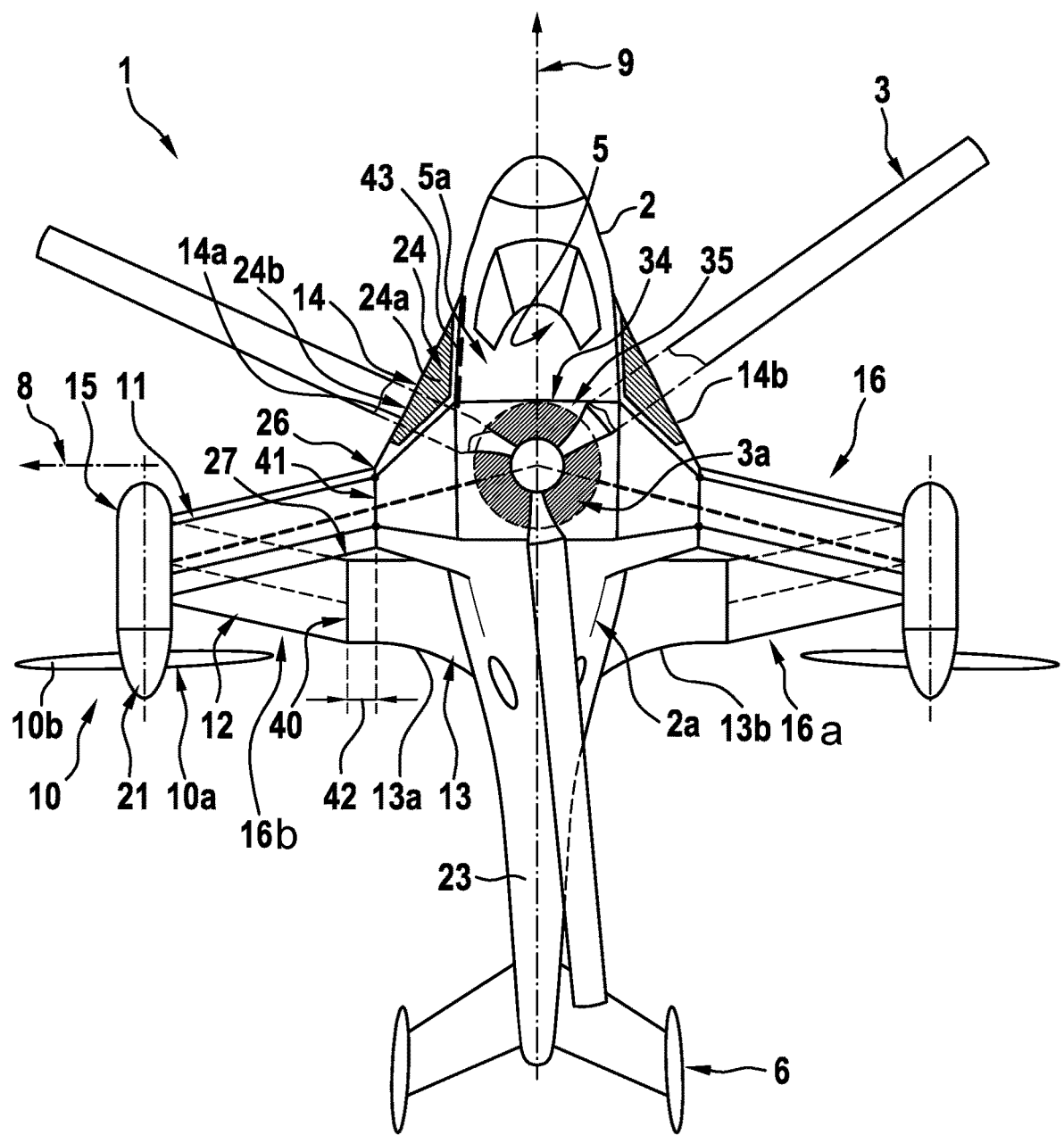
FIG. 4 shows a top view of the compound helicopter of FIG. 1 with the upper and lower wing section arrangements having differing outwards extensions.

FIG. 4 shows the compound helicopter 1 of FIG. 1 and FIG. 3 with the at least one main rotor 3, the two propellers 10, and the fuselage 2 having the tail boom 23, to which the empennage 6 is rigidly mounted. The compound helicopter 1 further preferably comprises a sliding door 43, which may likewise be provided in all other shown and described embodiments. Moreover, the compound helicopter 1 comprises the fixed wing arrangement 11, 12 with the box wings 16 comprising the starboard side wing assembly 16*a* and the portside wing assembly 16*b*, which respectively comprise the upper wing 11 and the lower wing 12.

FIG. 4 further illustrates the roll axis 9, i.e. the X-axis, and the pitch axis 8, i.e. the Y-axis, both of which are inherent to the compound helicopter 1. FIG. 4 also further illustrates the upper wing section arrangement 14 and the lower wing section arrangement 13 of FIG. 1 and FIG. 3. As described above with reference to FIG. 1 and FIG. 3, the upper wing section arrangement 14 comprises at least one starboard side upper wing section 14*a* and at least one portside upper wing section 14*b*, and the lower wing section arrangement 13 comprises at least one starboard side lower wing section 13*a* and at least one portside lower wing section 13*b*.

However, in contrast to FIG. 1 and FIG. 3 the upper wing section arrangement 14 and the lower wing section arrangement 13 now exhibit differing widespans according to one aspect. In other words, the widespan of the upper wing section arrangement 14 and the widespan of the lower wing section arrangement 13 does not need to be identical, as illustrated in FIG. 1 and FIG. 3, but may differ by a predetermined distance 42, as illustrated in FIG. 4.

Illustratively and by way of example only, the widespan of the lower wing section arrangement 13 is greater than the widespan of the upper wing section arrangement 14. This enables e.g. a simplified integration of the wheel-type main landing gear 28 of FIG. 1 into the lower wing section arrangement 13, i.e. into the starboard side lower wing section 13*a* and the portside lower wing section 13*b*.

Furthermore, as described above with reference to FIG. 1 and FIG. 2, the upper wing section arrangement 14 comprises at least one equipment compartment 24 having an external geometry 24*b*. By way of example, two equipment compartments 24 are provided in the upper wing section arrangement 14, a first equipment compartment being formed in the at least one starboard side upper wing section 14*a* and a second equipment compartment being formed in the at least one portside upper wing section 14*b*. A respective space provided by the two equipment compartments 24 for the equipment 24*a* in the upper wing section arrangement 14 is directly linked to the outer shape of the upper wing section arrangement 14, i.e. to the external geometry 24*b* of the two equipment compartments 24. For purposes of illustration of this link, the two equipment compartments 24 are shown with external geometries 24*b* that differ from the ones shown in FIG. 2 and FIG. 3.

Figure 5:
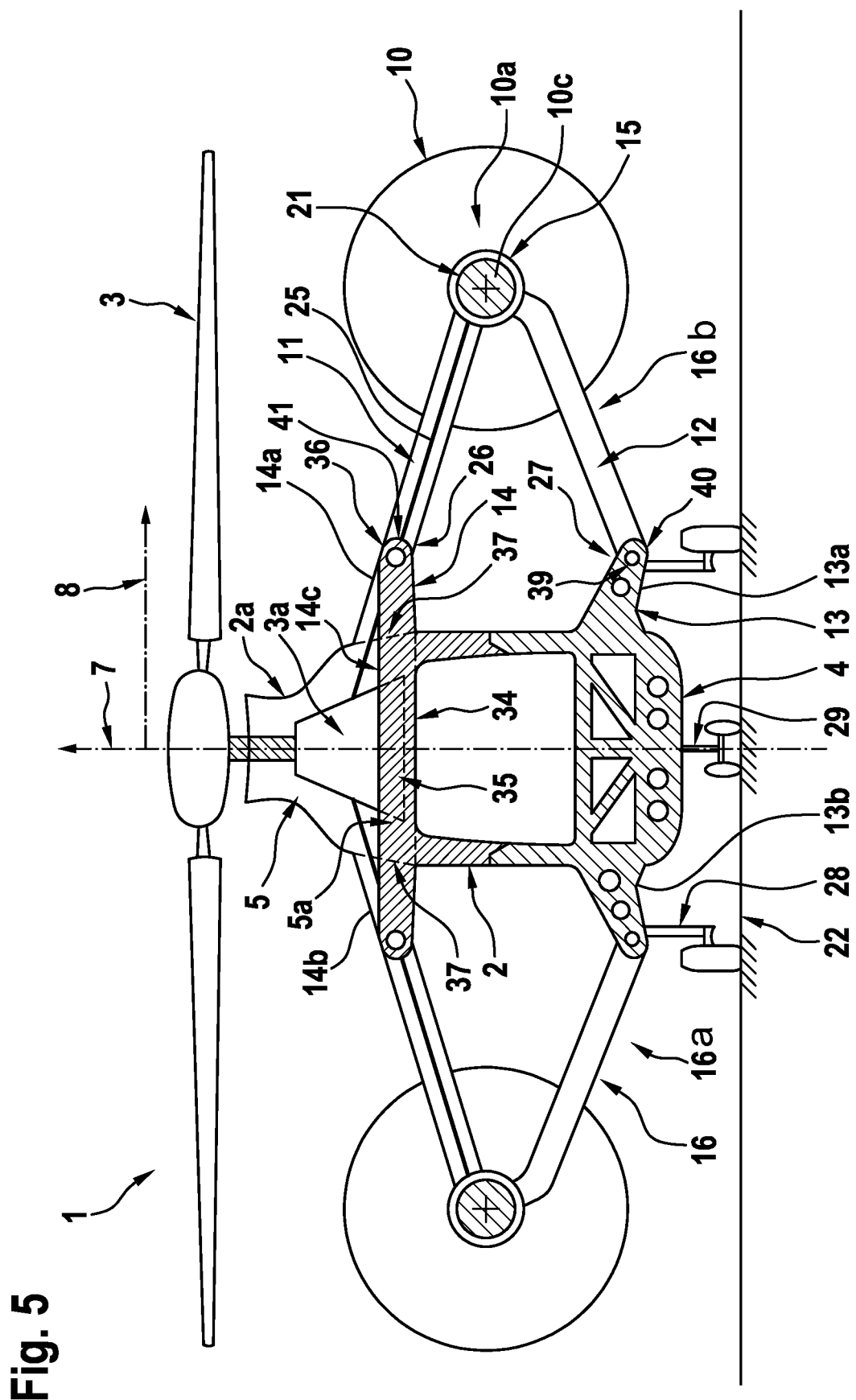
FIG. 5 shows a sectional view of the compound helicopter of FIG. 1.

FIG. 5 shows the compound helicopter 1 of FIG. 1 and FIG. 3 with the wheel-type main landing gear 28 and the wheel-type nose landing gear 29, the at least one main rotor 3, the two propellers 10, the main gear box 3*a*, the center wing box 35, and the fuselage 2. The compound helicopter 1 is illustratively standing on ground 22. Moreover, the compound helicopter 1 comprises the fixed wing arrangement 11, 12 with the box wings 16 comprising the starboard side wing assembly 16*a* and the portside wing assembly 16*b*, which respectively comprise the upper wing 11 and the lower wing 12.

As described above with reference to FIG. 1, each one of the propellers 10 comprises a housing 21 that is rigidly attached to an associated one of the wing interconnection regions 15 and each propeller 10 comprises a propeller disc 10*a*. According to one aspect, each propeller 10 comprises a propeller gear box 10*c* which is mounted inside of the housing 21. The propeller gear box 10*c* is driven by the main gear box 3*a* via the drive shaft 25. Thus, provision of separate engines for driving the propellers 10 can advantageously be omitted.

FIG. 5 further illustrates the pitch axis 8, i.e. the Y-axis, and the yaw axis 7, i.e. the Z-axis, both of which are inherent to the compound helicopter 1. For further illustrating the fuselage 2 according to one aspect, the fuselage 2 is shown in sectional view, i.e. cut in planes formed by the Y- and Z-axes. However, it should be noted that the cuts in lower region 4 and upper region 5 of the fuselage 2 are lying in separate planes that are illustratively arranged in parallel, as the upper and lower wings 11, 12 are preferably staggered.

FIG. 5 also further illustrates the front spar 34 of the center wing box 35, the upper wing section arrangement 14, and the lower wing section arrangement 13 of FIG. 1 and FIG. 3. As described above with reference to FIG. 1 to FIG. 3, the lower wing section arrangement 13 comprises at least one starboard side lower wing section 13*a* and at least one portside lower wing section 13*b*, and the upper wing section arrangement 14 comprises at least one starboard side upper wing section 14*a* and at least one portside upper wing section 14*b*. Each one of the starboard side upper wing section 14*a* and the portside upper wing section 14*b* preferably comprises at least one upper wing section front spar 14*c*. According to one aspect, the at least one upper wing section front spar 14*c* is combined with the front spar 34 of the center wing box 35 to form an integral part.

More specifically, the front spar 34 and the upper wing section front spars 14*c* of the starboard side upper wing section 14*a* as well as the portside upper wing section 14*b* are according to one aspect integrally formed and, thus, provided in monolithic design, i.e. without any joint or seam and as a single unit. Therefore, the starboard side upper wing section 14*a* and the portside upper wing section 14*b* form an integral part of the fuselage 2. This applies likewise to the starboard side lower wing section 13*a* and the portside lower wing section 13*b* of the lower wing section arrangement 13 which preferably and illustratively also form an integral part of the fuselage 2.

Figure 6:
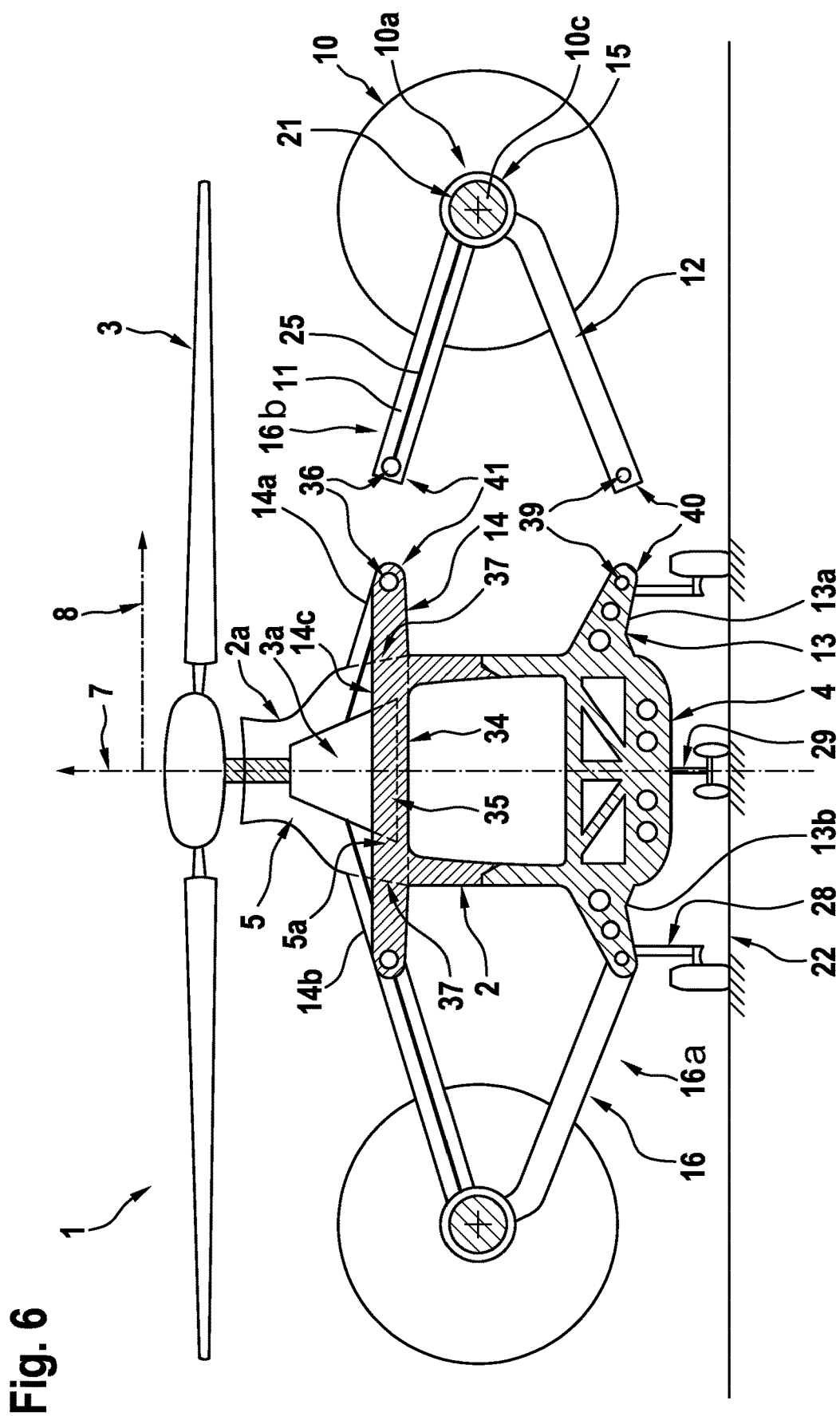
FIG. 6 shows a sectional view of the compound helicopter of FIG. 1 in transportation condition.

FIG. 6 shows the compound helicopter 1 of FIG. 1 and FIG. 3 with the wheel-type main landing gear 28 and the wheel-type nose landing gear 29, the at least one main rotor 3, the two propellers 10, the main gear box 3*a*, the center wing box 35, and the fuselage 2. Each one of the propellers 10 comprises a housing 21 that is rigidly attached to an associated one of the wing interconnection regions 15 and each propeller 10 comprises a propeller disc 10*a*. Furthermore, each propeller 10 comprises a propeller gear box 10*c* which is mounted inside of the housing 21. The propeller gear box 10*c* is driven by the main gear box 3*a* via the drive shaft 25, so that provision of separate engines for driving the propellers 10 can advantageously be omitted. The compound helicopter 1 is illustratively standing on ground 22.

As described above with reference to FIG. 1, the compound helicopter 1 comprises the fixed wing arrangement 11, 12 with the box wings 16 comprising the starboard side wing assembly 16*a* and the portside wing assembly 16*b*, which respectively comprise the upper wing 11 and the lower wing 12. The upper wing 11 is preferably removably attachable to the upper wing section arrangement 14 by means of the joint 41. Similarly, the lower wing 12 is preferably removably attachable to the lower wing section arrangement 13 by means of the joint 40. The joints 40 and 41 may be embodied by a hinged connection, comprising illustratively hinges 36 and 39.

Illustratively, the compound helicopter 1 is shown in FIG. 6 in an exemplary transportation condition that corresponds to a transport or storage configuration. More specifically, in this transportation condition the upper wing 11 and the lower wing 12 are preferably dismounted from the upper wing section arrangement 14 and the lower wing section arrangement 13, respectively. Consequently, the propeller 10 which is arranged at the wing interconnection region 15 of the upper and lower wing 11, 12 is likewise dismounted from the compound helicopter 1.

According to one aspect, the starboard side wing assembly 16a with the upper wing 11, the lower wing 12 and the propeller 10 can be separately assembled, stored and transported, and preferably re-assembled as a pre-assembled unit to the compound helicopter 1. This can easily be done by mounting the upper wing 11 to the upper wing section arrangement 14 via the joint 41 by means of the hinges 36, and the lower wing 12 to the lower wing section arrangement 13 via the joint 40 by means of the hinges 39.

However, it should be noted that only the starboard side wing assembly 16a is shown in dismounted state, while the portside wing assembly 16b is shown in mounted state. Nevertheless, it should be clear that the portside wing assembly 16b may likewise be dismounted.

Figure 7:
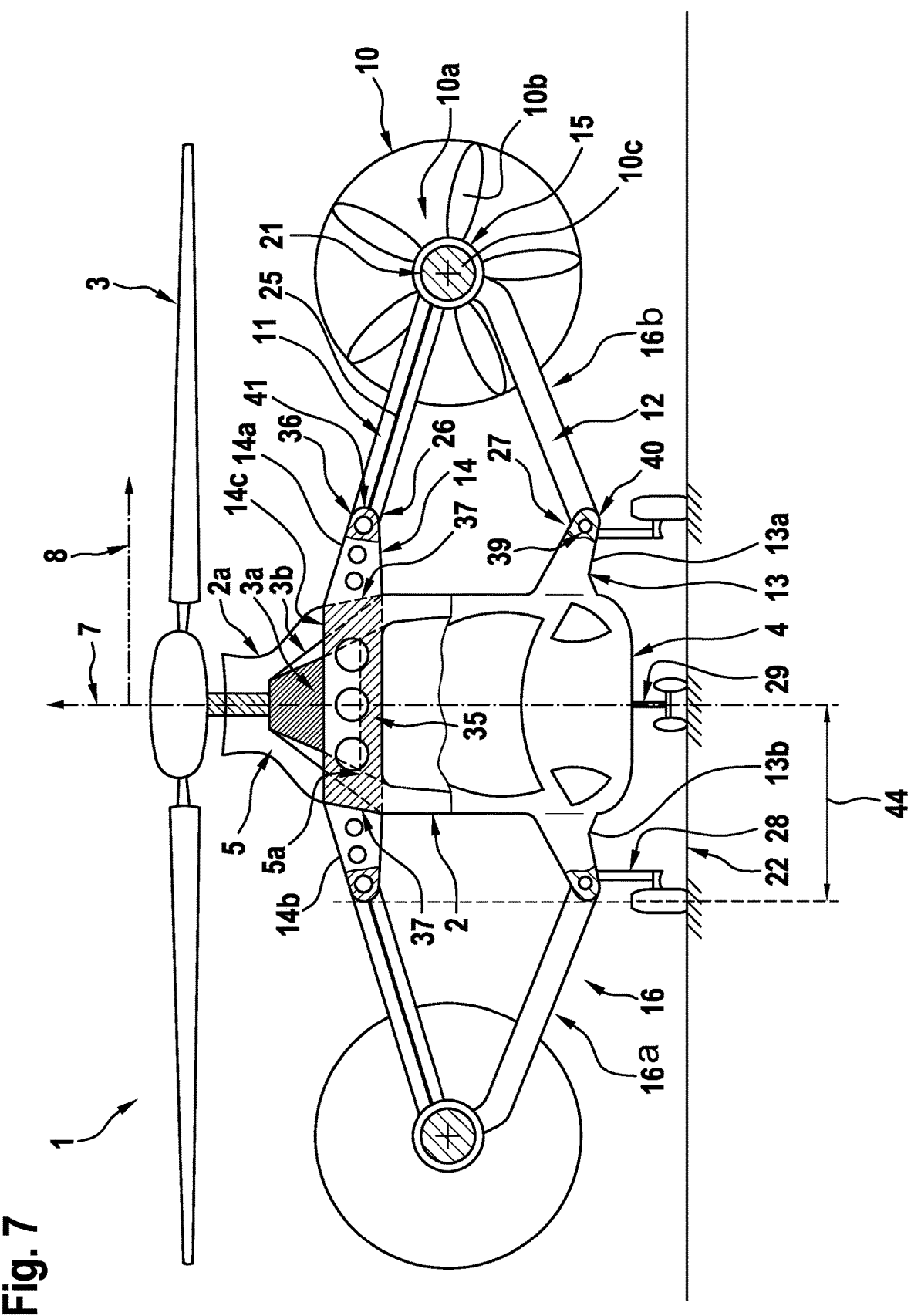
FIG. 7 shows another sectional view of the compound helicopter of FIG. 1, with the upper and lower wing section arrangements.

FIG. 7 shows the compound helicopter 1 of FIG. 1 and FIG. 3 with the wheel-type main landing gear 28 and the wheel-type nose landing gear 29, the at least one main rotor 3, the two propellers 10, the main gear box 3a, the center wing box 35, and the fuselage 2. Each one of the propellers 10 comprises a housing 21 that is rigidly attached to an associated one of the wing interconnection regions 15 and each propeller 10 comprises a propeller disc 10a. Furthermore, each propeller 10 comprises a propeller gear box 10c which is mounted inside of the housing 21. The propeller gear box 10c is driven by the main gear box 3a via the drive shaft 25, so that provision of separate engines for driving the propellers 10 can advantageously be omitted. The compound helicopter 1 is illustratively standing on ground 22.

As described above with reference to FIG. 1, the compound helicopter 1 comprises the fixed wing arrangement 11, 12 with the box wings 16 comprising the starboard side wing assembly 16a and the portside wing assembly 16b, which respectively comprise the upper wing 11 and the lower wing 12. Moreover, as described above with reference to FIG. 2 and FIG. 3, the compound helicopter 1 comprises the center wing box 35 located on the upper deck 5a in the upper region 5 of the fuselage 2. The center wing box 35 comprises the front spar (34 in FIG. 3 to FIG. 6) and the aft spar (38 in FIG. 3) and the at least one lateral rib 37 is located between the front spar and the aft spar.

In comparison to FIG. 5 and FIG. 6, a respective height of the center wing box 35 is illustratively significantly increased and shown in an extreme configuration. In this extreme configuration, the respective height of the center wing box 35 corresponds to the maximum possible height of the upper wing section arrangement 14. This configuration offers a significantly increased stiffness of the upper wing section arrangement 14.

Furthermore, according to one aspect a comparatively rigid area is established in the upper region 5 of the fuselage 2 by a combination of the center wing box 35 with respective main gear box struts 3b that support the main gear box 3a. This rigidity may advantageously be exploited for introduction of the equipment 24a of FIG. 1 into the upper wing section arrangement 14.

Furthermore, as described above with reference to FIG. 1 to FIG. 3, the lower wing section arrangement 13 comprises at least one starboard side lower wing section 13a and at least one portside lower wing section 13b, and the upper wing section arrangement 14 comprises at least one starboard side upper wing section 14a and at least one portside upper wing section 14b. At least for practical reasons, preferably a predetermined maximum distance 44 between a center line of the compound helicopter 1, which is exemplarily illustrated by the yaw axis 7, i.e. the Z-axis, and respective outer ends of the lower and/or upper wing sections 13a, 13b, 14a, 14b is allowed. Each one of the lower and/or upper wing section arrangements 13, 14 is preferably limited by this predetermined maximum distance 44. Preferably, this predetermined maximum distance 44 can be determined in an application-specific and compound helicopter type dependent manner.

Finally, it should be noted that further modifications are also within the common knowledge of the person skilled in the art and, thus, also considered as being part of the present invention.

REFERENCE LIST

1 Compound helicopter
2 Fuselage
2a Engine cowling
3 Main rotor
3a Main gear box
3b Main gear box struts
4 Lower region of fuselage
5 Upper region of fuselage
5a Upper deck
6 Empennage
7 Yaw axis
8 Pitch axis
9 Roll axis
10 Propeller
10a Propeller disc
10b Propeller Blade
10c Propeller gear box
11 Upper wing
11a Upper wing front spar
11b Upper wing aft spar
11c Upper wing center axis
12 Lower wing
12a Lower wing front spar
12b Lower wing aft spar
12c Lower wing center axis
13 Lower wing section arrangement
13a Starboard side lower wing section
13b Portside lower wing section
14 Upper wing section arrangement
14a Starboard side upper wing section
14b Portside upper wing section
14c Upper wing section front spar
14d Upper wing section aft spar
15 Wing interconnection region of upper and lower wings
16 Box wing
16a, 16b Upper and lower wing assemblies
17 Upper wing sweep angle
18 Lower wing sweep angle
19 Upper wing quarter chord line
20 Lower wing quarter chord line
21 Propeller housing
22 Ground
23 Tail boom
24 Equipment compartment
24a Equipment
24b Equipment compartment external geometry
25 Propeller drive shaft 26 Wing interconnection region of upper wing and upper wing section
27 Wing interconnection region of lower wing and lower wing section
28 Wheel-type main landing gear
29 Wheel-type nose landing gear
30 Upper skin of upper wing section
31 Lower skin of upper wing section
32 Dihedral angle of lower wing relative to horizontal (ground) plane
33 Anhedral angle of upper wing relative to horizontal direction
34 Combined main frame of fuselage and front spar of center wing box
35 Center wing box
36 Upper wing to upper wing section hinges
37 Lateral ribs in upper wing section
38 Combined main frame of fuselage and aft spar of center wing box
39 Lower wing to lower wing section hinges
40 Lower wing to lower wing section joint
41 Upper wing to upper wing section joint
42 Difference of widespan between upper wing section and lower wing section
43 Sliding door
44 Maximum distance between center line and outer end of lower and/or upper wing sections

What is claimed:

1. A compound helicopter with at least one main rotor that is operably coupled to an associated main gear box and at least adapted for generating lift in operation, the helicopter comprising:
    a fuselage with a lower region and an upper region that is opposed to the lower region, the at least one main rotor and the associated main gear box being arranged in the upper region,
    an upper wing section arrangement provided in an upper region of the fuselage, wherein the upper wing section arrangement comprises at least one upper wing section,
    a fixed wing arrangement that is laterally attached to the fuselage, the fixed wing arrangement comprising at least one upper wing and at least one lower wing which are at least interconnected at an interconnection region and which are respectively connected to the fuselage, wherein the at least one upper wing of the fixed wing arrangement is mounted to the fuselage via the upper wing section of the upper wing section arrangement, and
    at least one propeller that is at least adapted for generating forward and/or backward thrust in operation, wherein each propeller is mounted to an associated interconnection region.

2. The compound helicopter of claim 1,
wherein the at least one upper wing of the fixed wing arrangement is mounted to the upper wing section arrangement by means of a hinged connection or a clamped connection.

3. The compound helicopter of claim 1,
wherein the at least one upper wing of the fixed wing arrangement is rigidly attached to the upper wing section arrangement.

4. The compound helicopter of claim 1,
wherein the upper wing section arrangement comprises at least one starboard side upper wing section and at least one portside upper wing section, wherein the at least one upper wing of the fixed wing arrangement is mounted to one of the at least one starboard side upper wing section or the at least one portside upper wing section.

5. The compound helicopter of claim 4,
wherein the at least one starboard side upper wing section and the at least one portside upper wing section are interconnected by means of an associated center wing box that is arranged in the upper region of the fuselage.

6. The compound helicopter of claim 4,
wherein the upper wing section arrangement is an integral part of the fuselage.

7. The compound helicopter of claim 4,
wherein the associated center wing box comprises at least one front spar and at least one aft spar, wherein at least one of the at least one front spar or the at least one aft spar is implemented by a main frame of the fuselage that supports the main gear box.

8. The compound helicopter of claim 7,
wherein each one of the at least one starboard side upper wing section and the at least one portside upper wing section comprises at least one upper wing front spar and at least one upper wing aft spar, the at least one upper wing front spar being connected to the at least one front spar of the associated center wing box, and the at least one upper wing aft spar being connected to the at least one aft spar of the associated center wing box.

9. The compound helicopter of claim 8,
wherein the at least one upper wing front spar is an integral part of the at least one front spar of the associated center wing box, and that the at least one upper wing aft spar is an integral part of the at least one aft spar of the associated center wing box.

10. The compound helicopter of claim 1,
wherein the upper wing section arrangement comprises at least one equipment compartment that is provided for accommodating a rescue hoist or a life raft.

11. The compound helicopter of claim 1,
wherein a lower wing section arrangement is provided in the lower region of the fuselage, wherein the at least one lower wing of the fixed wing arrangement is mounted to the lower wing section arrangement.

12. The compound helicopter of claim 11,
wherein the lower stub wing arrangement comprises at least one starboard side lower wing section and at least one portside lower wing section, wherein the at least one lower wing of the fixed wing arrangement is removably mounted to one of the at least one starboard side lower wing section or the at least one portside lower wing section by means of a hinged connection or a clamped connection.

13. The compound helicopter of claim 11,
wherein the lower wing section arrangement comprises at least one starboard side lower wing section and at least one portside lower wing section, wherein the at least one lower wing of the fixed wing arrangement is rigidly attached to one of the at least one starboard side lower wing section or the at least one portside lower wing section.

14. The compound helicopter of claim 12,
wherein a wheel-type main landing gear is provided, the wheel-type main landing gear being mounted to the at least one starboard side lower wing section and the at least one portside lower wing section, adjacent to the at least one lower wing of the fixed wing arrangement.

15. The compound helicopter of claim 14,
wherein the wheel-type main landing gear is at least partly retractable into the at least one starboard side lower wing section and the at least one portside lower wing section in operation.

16. The compound helicopter of claim 1,
wherein the at least one upper wing of the fixed wing arrangement is removably mounted to the upper wing section arrangement.

17. A compound helicopter comprising:
a fuselage with a lower region and an upper region that is opposed to the lower region;
a main rotor operably coupled to a main gear box and adapted for generating lift in operation, the main rotor and the main gear box arranged in the upper region of the fuselage;
an upper wing section arrangement in the upper region of the fuselage, the upper wing section arrangement having a starboard upper wing section and a port upper wing section each extending laterally outwardly from the upper region of the fuselage to respective outer ends;
a starboard fixed wing arrangement with a starboard upper wing and a starboard lower wing interconnected to one another at an interconnection region, the starboard upper wing and the starboard lower wing each connected to the fuselage, wherein the starboard upper wing is mounted to the fuselage via the starboard upper wing section at the outer end thereof;
a port fixed wing arrangement with a port upper wing and a port lower wing interconnected to one another at an interconnection region, the port upper wing and the port lower wing each connected to the fuselage, wherein the port upper wing is mounted to the fuselage via the port upper wing section at the outer end thereof;
a starboard propeller mounted to the interconnection region of the starboard fixed wing arrangement, the starboard propeller adapted for generating forward and/or backward thrust in operation; and
a port propeller mounted to the interconnection region of the port fixed wing arrangement, the port propeller adapted for generating forward and/or backward thrust in operation.

18. A compound helicopter of claim 17 wherein the starboard upper wing section and the port upper wing section are each covered by an upper skin and a lower skin.

19. A compound helicopter of claim 17 further comprising a front spar and an aft spar, each of the front and aft spars extending from the outer end of the starboard upper wing section to the outer end of the port upper wing section through the upper region of the fuselage, wherein the front and aft spars form a main frame of the fuselage and support the main gear box.

20. A compound helicopter of claim 17 further comprising a lower wing section arrangement provided in the lower region of the fuselage, the lower wing section arrangement having a starboard lower wing section and a port lower wing section each extending laterally outwardly from the lower region of the fuselage to respective outer ends;
wherein the starboard lower wing of the starboard fixed wing arrangement is mounted to the fuselage via the starboard lower wing section at the outer end thereof; and
wherein the port lower wing of the port fixed wing arrangement is mounted to the fuselage via the port lower wing section at the outer end thereof.

* * * * *